(12) United States Patent
Sarkas et al.

(10) Patent No.: US 9,105,923 B2
(45) Date of Patent: Aug. 11, 2015

(54) ZINC ANODE ALKALINE ELECTROCHEMICAL CELLS CONTAINING BISMUTH

(71) Applicant: Nanophase Technologies Corporation, Romeoville, IL (US)

(72) Inventors: Harry W. Sarkas, Plainfield, IL (US); Igor V. Barsukov, Glenview, IL (US)

(73) Assignee: Nanophase Technologies Corporation, Romeoville, IL (US)

( * ) Notice: Subject to any disclaimer, the term of this patent is extended or adjusted under 35 U.S.C. 154(b) by 104 days.

(21) Appl. No.: 13/766,467

(22) Filed: Feb. 13, 2013

(65) Prior Publication Data

US 2014/0227592 A1    Aug. 14, 2014

(51) Int. Cl.
*H01M 4/13* (2010.01)
*H01M 4/38* (2006.01)
*H01M 4/42* (2006.01)
*H01M 4/24* (2006.01)
*H01M 4/36* (2006.01)

(52) U.S. Cl.
CPC ............... *H01M 4/38* (2013.01); *H01M 4/244* (2013.01); *H01M 4/364* (2013.01); *H01M 4/42* (2013.01)

(58) Field of Classification Search
CPC ......... H01M 4/38; H01M 4/42; H01M 4/364; H01M 4/244
USPC ......................................................... 429/211
See application file for complete search history.

(56) References Cited

U.S. PATENT DOCUMENTS

| | | | |
|---|---|---|---|
| 4,084,047 A | 4/1978 | Himy et al. |
| 4,195,120 A | 3/1980 | Rossler et al. |
| 4,432,937 A | 2/1984 | Kuwayama et al. |
| 4,606,869 A | 8/1986 | Showak |
| 4,812,374 A | 3/1989 | Kagawa et al. |
| 5,108,494 A | 4/1992 | Uemura et al. |
| 5,168,018 A | 12/1992 | Yoshizawa et al. |
| 5,240,793 A | 8/1993 | Glaeser |
| 5,308,374 A | 5/1994 | Yoshizawa et al. |
| 5,312,476 A | 5/1994 | Uemura et al. |
| 5,348,816 A | 9/1994 | Shinoda et al. |
| 5,376,480 A | 12/1994 | Shinoda et al. |
| 5,425,798 A | 6/1995 | Sasaki et al. |
| 5,460,701 A | 10/1995 | Parker et al. |
| 5,460,710 A | 10/1995 | Williams et al. |
| 5,541,021 A | 7/1996 | Watanabe et al. |
| 5,721,068 A | 2/1998 | West et al. |

(Continued)

FOREIGN PATENT DOCUMENTS

EP    0 457 354    11/1991
WO    WO94/19502    9/1994

(Continued)

OTHER PUBLICATIONS

Qu, D. "Behavior of dinonylphenol phosphate ester and its influence on the oxidation of a Zn anode in alkaline solution", Journal of Power Sources, vol. 162, pp. 706-712, (2006).

(Continued)

*Primary Examiner* — Jonathan Jelsma
(74) *Attorney, Agent, or Firm* — Evan Law Group LLC (57) ABSTRACT

A negative electrode active material for a zinc anode alkaline electrochemical cell includes (i) particles, comprising bismuth, and (ii) powder, comprising zinc. The particles have an average particle size of at most 135 nm.

20 Claims, 6 Drawing Sheets

(56) References Cited

U.S. PATENT DOCUMENTS

| | | | |
|---|---|---|---|
| 5,874,684 | A | 2/1999 | Parker et al. |
| 6,258,484 | B1 | 7/2001 | Nagata et al. |
| 6,428,932 | B1 | 8/2002 | Shinoda et al. |
| 6,461,768 | B1 | 10/2002 | Kitamura et al. |
| 6,706,220 | B1 | 3/2004 | Glaeser |
| 6,953,639 | B2 | 10/2005 | Kainthla et al. |
| 7,169,504 | B2 | 1/2007 | Armacanqui et al. |
| 7,374,840 | B1 | 5/2008 | Strauven et al. |
| 8,003,247 | B2 | 8/2011 | Tamakoshi et al. |
| 2002/0111277 | A1* | 8/2002 | Otto et al. .................... 505/825 |
| 2004/0009394 | A1* | 1/2004 | Ito et al. ........................ 429/206 |
| 2004/0185329 | A1 | 9/2004 | Kainthla et al. |
| 2004/0197656 | A1 | 10/2004 | Durkot et al. |
| 2006/0228629 | A1* | 10/2006 | Christian et al. ........... 429/231.1 |
| 2007/0166620 | A1* | 7/2007 | Issaev et al. ................. 429/232 |
| 2007/0264572 | A1 | 11/2007 | Zuraw |
| 2008/0008937 | A1* | 1/2008 | Eylem et al. ............... 429/218.1 |
| 2008/0153003 | A1 | 6/2008 | Alday Lesaga |

FOREIGN PATENT DOCUMENTS

| | | |
|---|---|---|
| WO | 03/071620 | 8/2003 |
| WO | WO03/106016 | 12/2003 |

OTHER PUBLICATIONS

Qu, D. "The cause of the voltage "dip" during the high rate discharge of the primary alkaline $MnO_2$/Zn cells", Electrochemistry Communications, vol. 8, pp. 1527-1530, (2006).

MCP Metalspecialties, Technical Data Sheet, "Bismuth Oxide, technical grade", 1 page, Feb. 10, 1998.

MCP Metalspecialties, Technical Data Sheet, "Bismuth Oxide, varistor grade fine", 1 page, Jan. 12, 2000.

Indium Corporation, Product Data Sheet, "Indium Hydroxide $In(OH)_3$", found at www.indium.com/technical-documents/product-data-sheets, 2 pages, printed on Feb. 11, 2013.

Indium Corporation, Product Data Sheet, "Indium Oxide (Indium Sesquioxide) $In_2O_3$", found at www.indium.com/technical-documents/product-data-sheets, 2 pages, printed on Feb. 11, 2013.

Lubrizol Corporation, Product Specifications, "Carbopol® 940 Polymer", found at www.lubrizol.com/personal-care/documents/specifications/carbopol%C2%AE-940-polymer.pdf, 1 page, Jun. 26, 2008.

International Search Report dated Jan. 8, 2015 for PCT application No. PCT/US2014/014988.

* cited by examiner

ZINC ANODE ALKALINE ELECTROCHEMICAL CELLS CONTAINING BISMUTH

BACKGROUND

Alkaline electrochemical cells, such as alkaline zinc-manganese dioxide batteries, include zinc powder as a negative electrode active material, and use an alkaline electrolyte, such as aqueous potassium hydroxide. Good physical contact between the zinc powder grains is necessary for good current collection. Furthermore, corrosion of the zinc in the presence of impurities dissolved in the alkaline electrolyte can produce hydrogen gas.

Historically, mercury was used as an alloying additive to the zinc powder in alkaline cells. The formation of the zinc amalgam with mercury improves the contact between zinc powder grains, improving current collection and reducing vibration sensitivity of the alkaline cells. The zinc amalgam with mercury also increases the hydrogen overvoltage, inhibiting corrosion of the zinc and hydrogen gas formation.

In an effort to eliminate mercury from alkaline cells, other additives have been used in its place. Indium has commonly been used to replace mercury. Unlike mercury, however, indium is not a liquid at room temperature. To improve contact between the zinc powder grains, the indium is introduced into the electrolyte as an indium compound, for example, as an oxide or hydroxide. The indium compound dissolves into the electrolyte, and subsequently plates out of solution to coat the zinc powder grains, and cements the grains together. Other metals are also alloyed with the zinc, to further enhance its properties.

Bismuth has also been used to replace mercury in alkaline cells. Bismuth has been introduced into the electrolyte as a bismuth compound, for example, as an oxide or hydroxide. As with indium, the bismuth compound dissolves into the electrolyte, and subsequently plates out of solution to coat the zinc powder grains, and cements the grains together. See, for example, U.S. Pat. No. 5,721,068.

Corrosion of zinc powder in the presence of an alkaline electrolyte is catalyzed by metal impurities which contaminate the latter as battery storage time increases. Since bismuth can form alloys with many of these metals, the bismuth captures the metal impurities which may be present in the electrolyte, as it plates out onto the zinc powder. This further reduces the corrosion of the zinc powder and hydrogen gas production. See, for example, U.S. Pat. Nos. 5,541,021 and 6,461,768.

The effect of particle size of the bismuth compound when used in an alkaline manganese dioxide cell containing zinc has been studied. See, for example, U.S. Pat. No. 6,258,484. Bismuth oxide, hydroxide and metal particles having an average particle size of 2 to 4 µm and a specific surface area of 1.2 to 2.4 $m^2/g$ (BET method), were compared to particles having an average particle size of 12 to 24 µm and a BET specific surface area of 0.4 to 0.8 $m^2/g$. It was found that the smaller particles having an average particle size of 2 to 4 µm and a BET specific surface area of 1.2 to 2.4 $m^2/g$, all produced the same results, and were superior in performance as compared to the larger particles.

SUMMARY

In a first aspect, the present invention is a negative electrode active material for a zinc anode alkaline electrochemical cell, comprising particles comprising bismuth, and powder comprising zinc. The particles have an average particle size of at most 135 nm.

In a second aspect, the present invention is a negative electrode active material for a zinc anode alkaline electrochemical cell, comprising particles comprising bismuth, and powder comprising zinc. The particles have a specific surface area of at least 5 $m^2/g$.

In a third aspect, the present invention is an anode gel for an alkaline electrochemical cell, comprising the negative electrode active material, an electrolyte, and a gelling agent.

In a fourth aspect, the present invention is an alkaline electrochemical cell, comprising a positive current collector, a cathode containing a cathode active material in electrical contact with the positive current collector, a negative current collector, the anode gel in electrical contact with the negative current collector, and a separator between the cathode active material and the anode gel.

In a fifth aspect, the present invention is a negative electrode active material for a zinc anode alkaline electrochemical cell, comprising particles comprising bismuth, and powder comprising zinc. The particles are capable of plating in an alkaline electrolyte environment at least 2000 ppm bismuth on a zinc substrate.

Definitions

The term "average particle size" refers to the mean particle diameter as determined by transmission electron microscopy, a number-average particle diameter.

The term "specific surface area" means specific surface area as determined by the BET method.

The phrase "capable of plating in an alkaline electrolyte environment" means under the experimental conditions of Example 5.

The term "anode" is defined as the negative electrode of an electrochemical power source when it undergoes a discharge process, for example extraction of its useful capacity by an external load. The terms "anode" and "negative electrode" are used interchangeably.

DETAILED DESCRIPTION

The present application makes use of the discovery that particles containing bismuth having an average particle size of at most 135 nm and/or having a specific surface area of at least 5 m²/g, are surprisingly and unexpectedly superior for use in alkaline cells, as compared to larger particles containing bismuth, for example larger particles have a particle size of at least 1000 nm (1.0 μm) having a specific surface area of at most 2.5 m²/g. The particles containing bismuth of the present application may be used to form a negative electrode active material, and alkaline electrochemical cells, such as alkaline batteries.

A negative electrode active material contains particles containing bismuth, and zinc or zinc alloy powder. The negative electrode active material may be used to form an anode gel, which further includes an electrolyte and a gelling agent, as well as optional agents. The anode gel may be used in an alkaline electrochemical cell, such as an alkaline battery.

An alkaline electrochemical cell includes a positive current collector; a cathode containing a cathode active material, in electrical contact with the positive current collector; a negative current collector; an anode gel, in electrical contact with the negative current collector; and a separator, between the cathode active material and the anode gel. The negative active material of the anode gel includes zinc. The cathode active material may be, for example, an electrochemically active form of manganese dioxide. An electrolyte, which allows for ionic conductivity between the anode and cathode during operation, is an alkaline aqueous electrolyte such as a solution of potassium hydroxide or sodium hydroxide, for example 20 to 50 wt % potassium hydroxide in water. The anode gel may also contain an aqueous electrolyte. Alkaline electrochemical cells include primary batteries (such as disposable batteries), as well as secondary batteries (rechargeable). Examples include zinc-manganese dioxide primary and rechargeable batteries, silver-zinc rechargeable batteries, nickel-zinc rechargeable batteries, zinc-air primary and rechargeable batteries, silver oxide primary batteries and copper oxide primary batteries.

Figure 1:
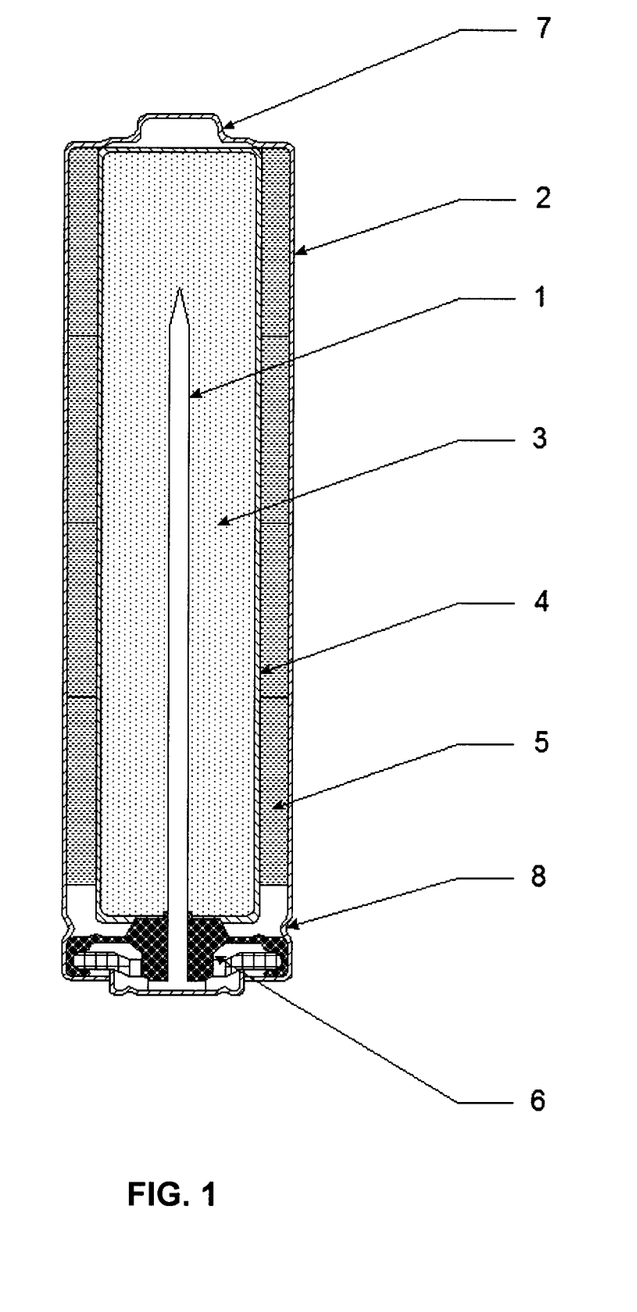
FIG. 1 is a cross-sectional diagram of an alkaline battery.

FIG. 1 is a cross-sectional diagram of an exemplary primary alkaline zinc-manganese dioxide battery. The battery includes a positive current collector 2, which may be a drawn steel container open on one end having a thickness of about 0.012 inches. The cathode annular rings 5 are placed into the positive current collector, forming a pressure contact with the positive current collector 2. A bead 8 is rolled into the container near the open end to support the sealing disk. A separator 4 and an anode gel 3 are placed inside of the stack of cathode rings 5. The anode gel 3 contains a powder of zinc or a zinc alloy, particles containing bismuth, an electrolyte, and a gelling agent, and optionally additional gelling agents, surfactant, and/or organic inhibitors. A sealing disk 6 containing a negative current collector 1 is placed into the open end of the container and in contact with the bead. The open end of the container is crimped over the sealing disk thus compressing the sealing disk between the crimp and the bead to seal the cell. Terminal cap 7 may be welded onto the positive current collector 2. Although a cylindrical cell is shown, an alkaline battery may be formed in a variety of sizes and shapes, for example, AA batteries, AAA batteries, C batteries, D batteries, 9 V batteries, and button cells.

The particles containing bismuth are preferably bismuth oxide, bismuth hydroxide and mixtures thereof. Other bismuth compounds, as well as bismuth metal and alloys containing bismuth, may also be used. The particles containing bismuth have an average particle size of at most 135 nm, preferably an average particle size of at most 105 or 100 nm, and most preferably an average particle size of at most 50 nm. Examples include particles containing bismuth having an average particle size of 1 to 135 nm, 5 to 100 or 105 nm, 10 to 50 nm, such as 15, 20, 25, 30, 35, 40 and 45 nm. The particles containing bismuth may also be characterized as having a specific surface area of at least 5 m²/g, preferably at least 7 m²/g, and most preferably at least 15 m²/g. Examples include particles containing bismuth having a specific surface area of 5 to 100 m²/g, 7 to 50 m²/g, and 15 to 40 m²/g, such as 6, 8, 9, 10, 20 and 25 m²/g. Preferably, the bismuth containing particles include tetragonal phase bismuth oxide ($Bi_2O_3$).

Particles containing bismuth may be produced by any suitable method, with plasma-based methods preferred. The methods and associated particle characteristics are described in U.S. Pat. No. 5,460,701, U.S. Pat. No. 5,874,684, and International App. Pub. No. WO 03/106016. The materials produced by these plasma-based methods are particles, which are fully dense crystallites that tend to be nearly equiaxed. Average particle size determinations can be made using electron microscopy, but for these particles produced by plasma-based methods, average particle size (surface-area weighted average particle size) may also be accurately estimated within 30% from specific surface area using the following formula $$d = \frac{6}{\rho S}$$

where d is the mean particle diameter, $\rho$ is the crystal density of the material and S is the measured specific surface area. The density of tetragonal phase bismuth oxide ($Bi_2O_3$) is 8.9 g/cm³, and the density of hexagonal phase bismuth hydroxide ($Bi(OH)_3$) is 4.36 g/cm³. The materials produced using the plasma-based methods are further characterized by their high zeta potentials and associated high degree of dispersability in aqueous media. Bismuth oxide is easily produced by these methods, but bismuth hydroxide and mixtures of bismuth oxide and bismuth hydroxide may also be formed, for example by controlling the amount of humidity present in the oxygen-containing gas used during the plasma process, and by controlled exposure to water vapor after the particles are formed. Other bismuth compounds and bismuth metal may also be formed by reaction of the bismuth oxide particles with various gasses after particle formation.

Zinc powders and zinc alloy powders suitable for alkaline electrochemical cells preferably have an average particle size of 25 to 600 μm, and preferably have a particle size distribution where 90% of the particles, as determined by sieve analysis, range in size between 25 μm and 600 μm. Preferably, the zinc is free of mercury and is high purity zinc. Preferably, the Fe content of the zinc is 0.1 to 14 ppm. Suitable alloys of zinc, include alloys of Al, Ca, Mg, Li, Pb, Ga, Cd, Tl, Sn, Cu, Sr, and In with the preferred elements being Al, Ca, Bi, and In. Preferably, the alloying elements are each present at levels of 10-10,000 ppm, more preferably at levels of 50-2000 ppm, and most preferably at 100-500 ppm.

Examples of the zinc powders and zinc alloy powders include: U.S. Pat. No. 4,432,937 describes zinc alloys containing Ga and In with optional Pb and Cd; U.S. Pat. No. 4,606,869 describes atomized zinc alloy powders containing Li and Pb, and Li, Pb, and In; U.S. Pat. No. 5,108,494 describes low Fe (less than 1 ppm) zinc alloy powders containing two or more of Bi, Ca, Pb, In, and Al; U.S. Pat. No. 5,240,793 describes low Pb zinc alloy powders containing one or more of In and Bi with optional alkali and alkaline earth metals; International App. Pub. No. WO 94/19502 describes zinc alloy powders containing one or more of Al, Bi, In, Pb, and Ca or Li; U.S. Pat. No. 5,312,476 describes zinc alloy powders containing Bi, In, Al, Ca, and Pb; U.S. Pat.

No. 5,425,798 describes zinc alloy powders containing one or more of Bi, Al, and In; U.S. Pat. No. 6,428,932 describes zinc alloy powders having a flat shape containing In, Bi, and Mg; U.S. Pat. No. 6,706,220; describes zinc alloy powders having irregular shapes and specified bulk density; U.S. Pat. App., Pub. No. 2007/0264572 describes zinc alloy powders containing Bi, In, and Al of spherical shape and spheroidal shapes of aspect ratio up to 2.0; U.S. Pat. No. 6,428,932 describes zinc alloy powders; U.S. Pat. No. 7,374,840 describes an atomized zinc alloy powder containing either In and Al or Bi, or In and Bi with either Al or Ca; U.S. Pat. App., Pub. No. 2008/0153003 describes an atomized zinc alloy powder containing Al, Bi, In, Mg and Sr. Zinc alloy powders are available from commercial sources including Grillo-Werke AG (Duisburg, Germany), Umicore Zinc Chemicals (Angleur, Belgium), or Mitsui Zinc Powder LLC (Monaca, Pa., USA). Specific examples of suitable zinc alloys are UM004 (Bi=500 ppm, In=500 ppm, Pb=500 ppm nominal with 70% of the particle size distribution between 150 μm and 500 μm) from Umicore and BIA-bm Grade (Bi=100 ppm, In=200 ppm, Al=100 ppm nominal with 90% of the particle size distribution between 45 μm and 250 μm) from Mitsui Zinc Powder LLC.

The amount of particles containing bismuth in the negative electrode active material may be 0.0001 to 20% by weight of the total negative electrode active material, preferably 0.001 to 10% by weight, more preferably 0.005 to 1% by weight, and most preferably 0.01 to 0.1% by weight, including 0.02%, 0.03%, 0.04%, 0.05%, 0.06%, 0.07%, 0.08% and 0.09%, by weight. The remainder of the negative electrode active material may be zinc powder or zinc alloy powder.

An anode gel suitable for an alkaline electrochemical cell may be prepared as follows. Electrolyte solution is prepared by dissolving 0.5 M ZnO into 9 M KOH aqueous solution, under agitation. Next, 0.2 to 3.0% (preferably 0.6%) by weight of a gelling agent is added to the electrolyte solution under agitation using a paddle blade mixer at several hundred revolutions-per-minute (RPM), until fully dissolved and a uniform gel is formed. The particles containing bismuth are then added to the gel under agitation and mixed until fully dispersed and a homogeneous gel is formed.

The zinc powder or zinc alloy powder is next added to the electrolyte gel at a level of 1 to 3 parts powder per 1 part electrolyte gel. A preferred composition contains zinc alloy powder at a level of 65% by weight relative to the total weight of the anode gel. The addition is performed under reduced agitation (10 to 100 RPM) to prevent the entrainment of air into the gel. The gel is mixed until uniform. Vacuum may optionally be applied to the anode gel to remove any entrained air. An organic inhibitor and/or a surfactant may be optionally added to either the electrolyte gel after the addition of gelling agent or to the anode gel after the addition of the zinc powder or zinc alloy powder.

Gelling agents are preferably water soluble polymers selected from polyacrylic acid and salts thereof, and cellulosic materials such as carboxymethyl cellulose and hydroxyethyl cellulose. The preferred gelling agents are polyacrylic acid gelling agents. A preferred material is polyacrylic acid Carbopol 940 (Lubrizol, Wickliffe, Ohio).

The optional surfactants and organic inhibitors may also be included in the anode gel. Qu describes the use of a dinonylphenol phosphate ester (Journal of Power Sources 162, 706 (2006)). U.S. Pat. No. 4,195,120 describes a complex of a phosphate ester with an ethylene oxide of an adduct type. U.S. Pat. No. 5,308,374 describes surfactant having a polyethylene oxide group as a hydrophilic group and a perfluoroalkyl group as a hydrophobic group. U.S. Pat. No. 7,169,504 describes a sulfonic acid surfactant in combination with an organic phosphate ester. A preferred surfactant and organic inhibitor is polyoxyethylene dinonylphenyl ether phosphate (CAS No 39464-64-7) Rhodafac RM 510 (Rhodia, S.A., Courbevoie, France).

EXAMPLES

Example 1

Figure 2:
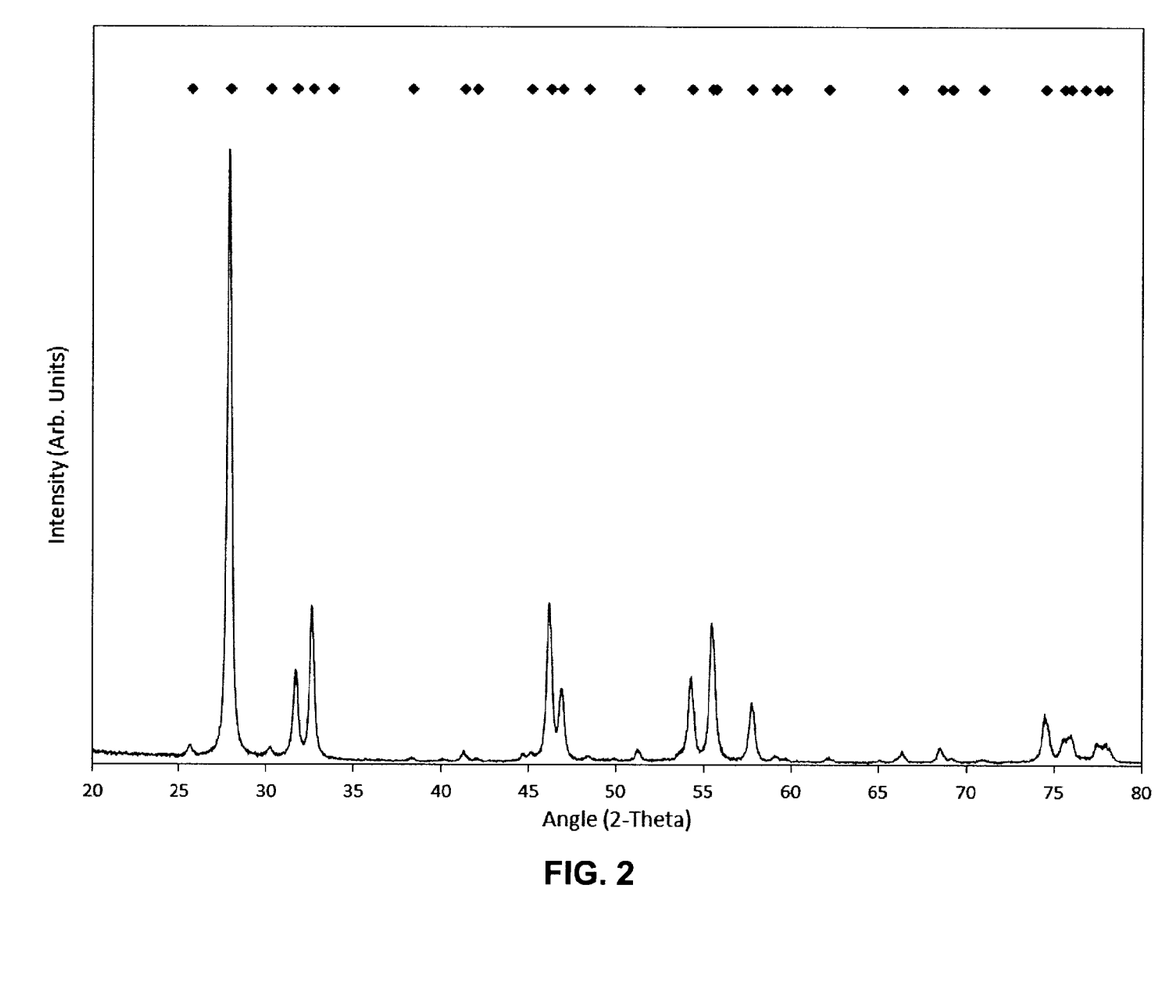
FIG. 2 is an X-ray powder diffraction pattern of the bismuth oxide powder of Example 1, having an average particle size of 32 nm and a specific surface area of 21 $m^2/g$.

Example 1 is bismuth oxide particles having a specific surface area of 21 m$^2$/g, which corresponds to an average particle size of 32 nm (assuming a density of 8.9 g/cm$^3$). This material was determined to be tetragonal phase $Bi_2O_3$ by X-ray powder diffraction (XRD). The powder diffraction pattern of this material is shown in FIG. 2. The diamonds above the diffraction pattern indicate the expected peak positions from the reference pattern for the tetragonal phase (JCPDS Reference Code 00-027-0050).

The diffraction pattern was used to estimate the average particle size (volume-weighted average particle diameter) of this material from a profile analysis of the peak broadening using the Scherrer equation:

$$B(2\theta) = \frac{K\lambda}{L\cos\theta}$$

where B(2θ) is the peak full width at half maximum, K is the Scherrer constant, λ is the X-ray wavelength, L is the volume average crystallite size, and θ is the Bragg angle. The average crystallite size for the bismuth oxide of Example 1 was estimated using the Scherrer equation to be 44 nm, which agrees with the particle size determined by specific surface area.

Example 2

Figure 3:
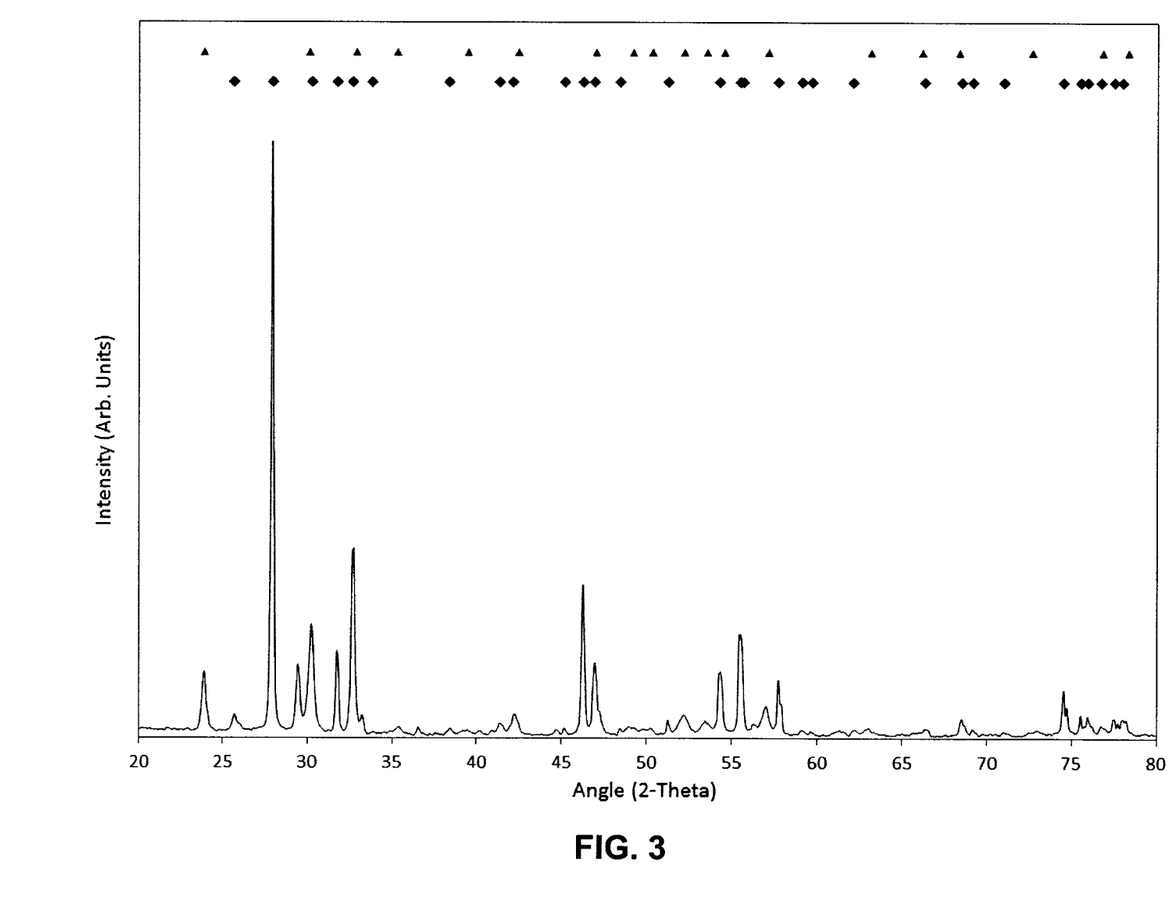
FIG. 3 is an X-ray powder diffraction pattern of the bismuth oxide and bismuth hydroxide powder mixture of Example 2, having an average particle size of 104 nm and a specific surface area of 7.2 $m^2/g$.

Example 2 is bismuth oxide and bismuth hydroxide mixed particles having an average particle size of 104 nm (assuming a density of 7.99 g/cm$^3$) and a specific surface area of 7.2 m$^2$/g. This material was determined to be a mixture of 80% tetragonal phase $Bi_2O_3$ and 20% and hexagonal phase $Bi(OH)_3$ by XRD. The powder diffraction pattern of this material is shown in FIG. 3. The diamonds above the diffraction pattern indicate the expected peak positions from the reference pattern for tetragonal phase (JCPDS Reference Code 00-027-0050) while the triangles above the diffraction pattern indicate the expected peak positions from the reference pattern for hexagonal phase $Bi(OH)_3$ (JCPDS Reference Code 00-001-0898). The average crystallite size for the particles of Example 2 was estimated using the Scherrer equation to be 134 nm, which agrees with the particle size determined by specific surface area.

Example 3

Figure 4:
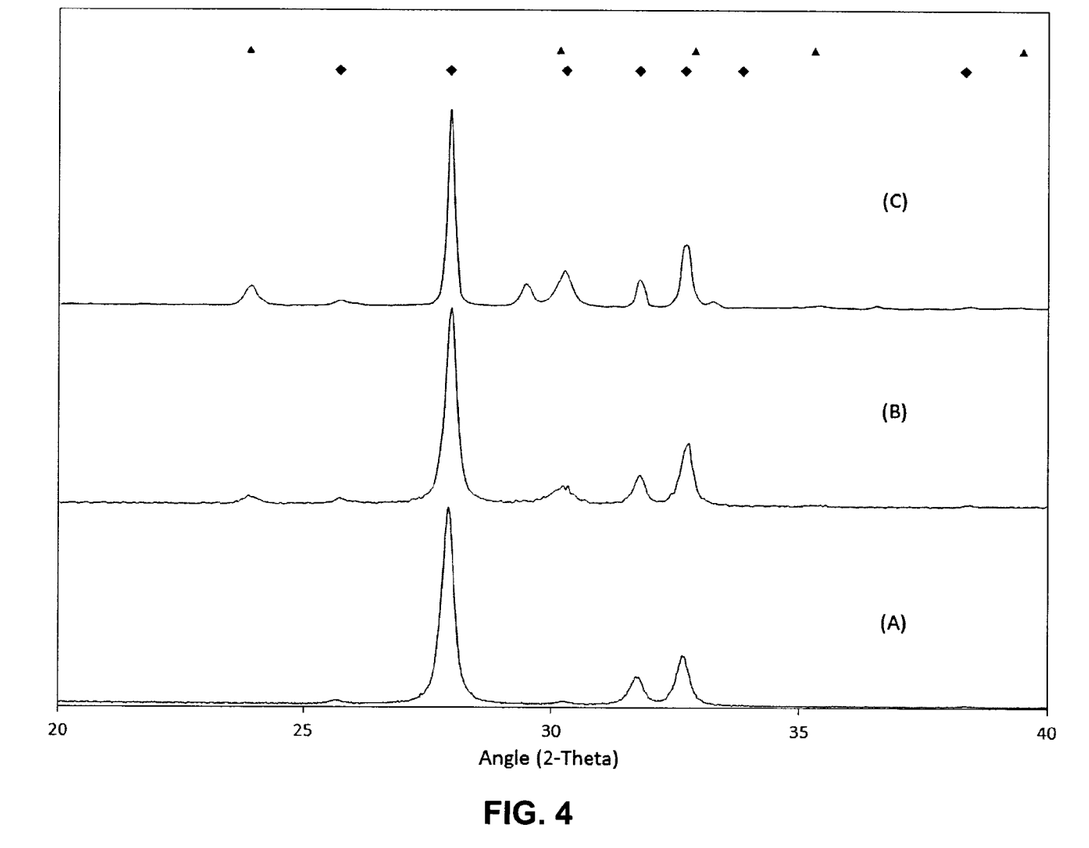
FIG. 4 is a comparison of the X-ray powder diffraction patterns of FIGS. 2 (pattern C) and 3 (pattern A), with an X-ray powder diffraction pattern of the bismuth oxide and bismuth hydroxide powder mixture of Example 3 (pattern B) having an average particle size of 34 nm and a specific surface area of 20 $m^2/g$.

Example 3 is bismuth oxide and bismuth hydroxide mixed particles having an average particle size of 34 nm (assuming a density of 8.74 g/cm$^3$) and a specific surface area of 20 m$^2$/g. This material was determined to be a mixture of 96.5% tetragonal phase $Bi_2O_3$ and 3.5% hexagonal phase $Bi(OH)_3$ by XRD. The powder diffraction pattern of this material is shown in FIG. 4 (B) together with the patterns from Example 1 (A) and Example 2 (C), for comparison. The diamonds above the diffraction pattern indicate the expected peak positions from the reference pattern for tetragonal phase (JCPDS Reference Code 00-027-0050) while the triangles above the diffraction pattern indicate the expected peak positions from the reference pattern for hexagonal phase $Bi(OH)_3$ (JCPDS Reference Code 00-001-0898). The average crystallite size for the particles of Example 3 was estimated using the Scherrer equation to be 47 nm, which agrees with the particle size determined by specific surface area. The relative differences in the particle sizes of these materials are evident from comparison of the peak widths of the most intense peaks at 2θ=27.947 degrees.

Example 4 (Comparative)

Figure 5:
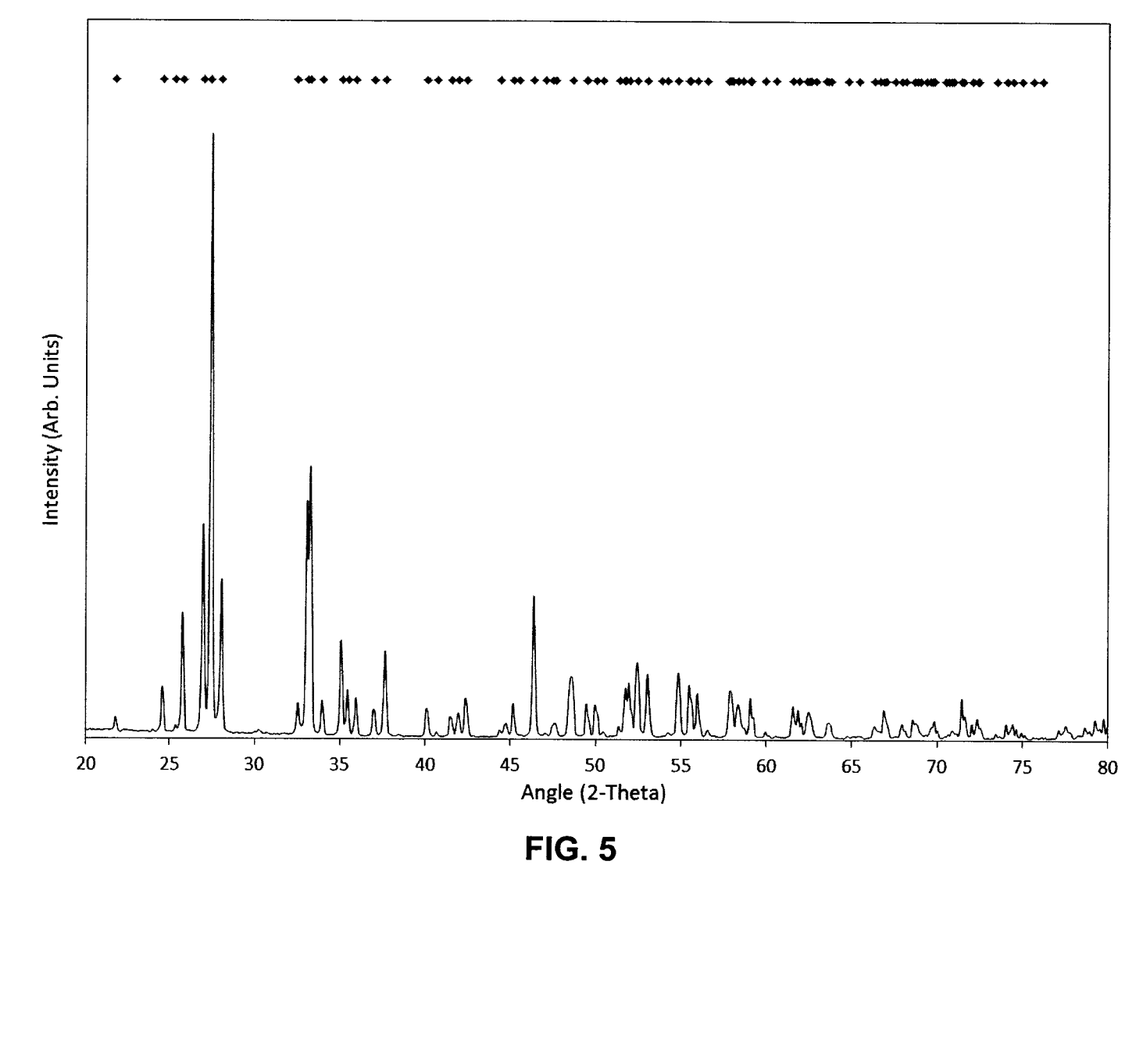
FIG. 5 is an X-ray powder diffraction pattern of the bismuth oxide powder of Example 4, having an average particle size of 1.6 µm and a specific surface area of 1.2 $m^2/g$.

Example 4 is bismuth oxide particles having physical characteristics consistent with the materials described in U.S. Pat. No. 6,258,484. This commercially available material (MCP Metal Specialties, Varistor Grade Fine, Fairfield, Conn.) has an average particle size of 1.6 μm and a specific surface area of 1.2 m$^2$/g, as described by the accompanying technical data sheet. This material was determined to be monoclinic phase $Bi_2O_3$ by XRD. The powder diffraction pattern of this material is shown in FIG. 5. The diamonds above the diffraction pattern indicate the expected peak positions from the reference pattern for monoclinic phase (JCPDS Reference Code 00-041-1449). The very narrow peak widths in this diffraction pattern are consistent with the substantially larger average particle size than the particles containing bismuth produced by plasma-based methods.

Example 5

The purpose of the particles containing bismuth in an alkaline cell is to provide stabilization of the zinc powder and zinc alloy powder, particularly with respect to the suppression of hydrogen gas generation that occurs from corrosion on the surfaces of the zinc powders and zinc alloy powders. The beneficial effect of bismuth compounds, as noted previously in U.S. Pat. Nos. 5,541,021, 6,258,484 and 6,461,768, which discuss the suppression of hydrogen gas generation as being associated with the deposition of bismuth on the surfaces of the zinc powders and zinc alloy powders. Not only does the bismuth coat the surface of the zinc powder, inhibiting corrosion, but it is also believed to remove (scavenge) metal ions from the electrolyte, such as iron, molybdenum, arsenic and vanadium, which are thought to catalyze the corrosion reaction.

This effect was measured for various particles containing bismuth having an average particle size of at most 135 nm and having a specific surface area of at least 5 m$^2$/g, and compared with other bismuth oxides, as well as indium materials commonly used in the industry, by means of a plating experiments carried out in an environment typical of an anode within an alkaline electrochemical cell.

The plating agents examined for plating efficacy were as follows (Table 1):

| Sample | Example Type | Particle Size (nm) | Specific Surface Area (m$^2$/g) |
|---|---|---|---|
| A | $Bi_2O_3$ Example 1 | 32 | 21 |
| B | 80% $Bi_2O_3$ + 20% $Bi(OH)_3$ Example 2 | 104 | 7.2 |
| C | $Bi_2O_3$ Example 4 (Comparative) | 1600 | 1.2 |
| D | $Bi_2O_3$ (Comparative) | 5500 | 0.2 |
| E | $In(OH)_3$ (Comparative) | 2000 | 55-65 |
| F | $In_2O_3$ (Comparative) | 1900 | 10.6 |

Material D = Bismuth Oxide, Technical Grade (MCP Metal Specialties (Fairfield, CT)).
Material E = Indium Hydroxide, Fine, (Indium Corporation of America (Utica, NY)).
Material E = Indium Oxide, Type B, Fine (Indium Corporation of America (Utica, NY)).

In this example, high purity zinc foil coupons served as a model for the surface of the zinc and zinc alloy powders used in alkaline battery anodes, which is reproducible, so that total surface area could be controlled. Zinc coupon substrate samples are prepared from 0.25 mm thick 99.999% Zn foil (Sigma-Aldrich, St. Louis, Mo.) and cut to 550±5 mg coupons in order to provide the same surface area for the deposition on each sample.

Electrolyte solutions were next prepared having a composition commonly employed in alkaline cells. A single solution was prepared for each plating agent material listed in the table above. In each case, 100 g of electrolyte solution was prepared by adding 0.15 g of plating agent to a 9 M KOH solution with 0.5 M dissolved ZnO. The solutions was stirred and allowed to sit for approximately 30 minutes before the introduction of Zn substrate coupons.

Multiple Zn substrate coupons were next placed into each electrolyte solution. The plated Zn substrate coupons were withdrawn at predetermined times (1 hr, 2, hr, 10 hr, 24, hr, 48 hr, 1 week). Each withdrawn Zn substrate coupon was rinsed with deionized water, air dried, and stored in a sealed container prior to elemental analysis to determine the level of deposited plating agent.

Figure 6:
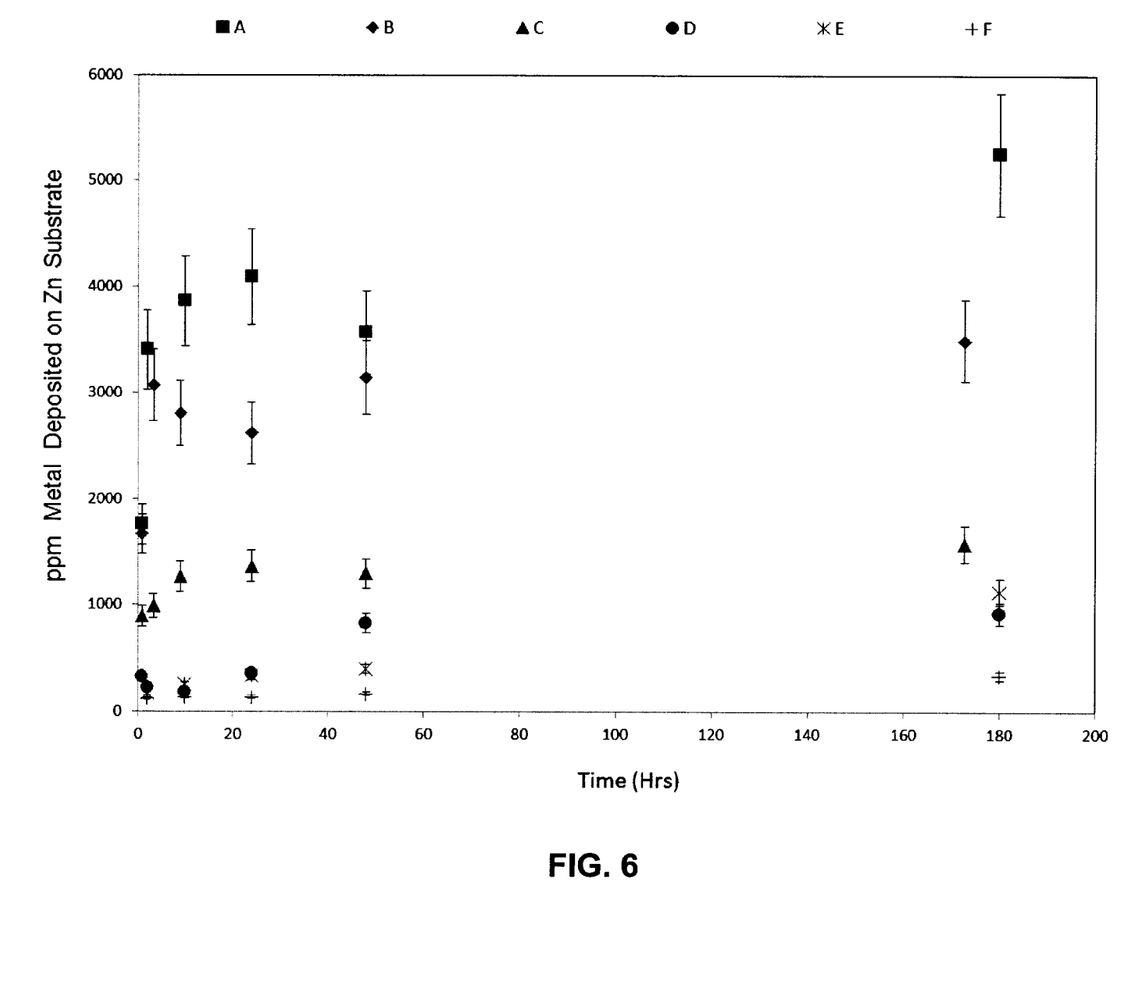
FIG. 6 is graph comparing the amount of metal deposited onto zinc substrates from 100 g of electrolyte solution prepared by adding 0.15 g of a plating agent to a 9 M solution of potassium hydroxide with 0.5 M dissolved zinc oxide. Note that the y-axis error bars in the plot reflect the cumulative standard error for the entire plating study method of 11% determined by running selected samples in triplicate.

Once all the plated Zn substrate coupons had been collected, the zinc substrate samples were each fully digested using nitric acid and diluted to a level appropriate for elemental analysis. The deposited amount of each plating agent was determined by ICP (inductively coupled plasma) spectroscopy on a Perkin Elmer Optima 4300 DV Optical Emission Spectrometer. Each sample contained an internal yttrium standard and was calibrated using matrix matched (common dissolved Zn level) calibration standards. The results of the analysis are shown in FIG. 6 and Table 2, below.

TABLE 2

Results of Example 5.

| Sample | Parts-per-million (ppm) of plating agent after 1 week |
|---|---|
| A | 5254 |
| B | 3494 |
| C | 1574 |
| D | 921 |
| E | 1130 |
| F | 339 |

It is evident from the data that the particles containing bismuth having an average particle size of at most 135 nm and/or having a specific surface area of at least 5 m$^2$/g (A and B) display significantly different and distinguishing behavior from either the bismuth oxide having an average particle size of 1600 nm (1.6 μm) and a specific surface area of 1.2 m$^2$/g (C), common commercially available bismuth oxide (D) or indium plating agents (E and F) commonly used in commercial electrochemical cells. The bismuth materials A and B not only show significantly faster initial rates of plating, but are able to deposit 2.2 to 3.3 times the amount of stabilizing material on a zinc surface than bismuth material C.

The significantly enhanced deposition imparted by the particles containing bismuth having an average particle size of at most 135 nm and/or having a specific surface area of at least 5 m$^2$/g, demonstrated by the data of Example 5, may be used to significant advantage in fabricating electrochemical cells with superior characteristics. The comparative bismuth materials C and D are equivalent to bismuth material having a particle size of 1000 nm or larger, such as that described in U.S. Pat. No. 6,258,484. This data demonstrates the superior and unexpectedly improved properties, plating rates and amounts, for particles containing bismuth having an average particle size of at most 135 nm and/or having a specific surface area of at least 5 m$^2$/g, that correlate with zinc powder and zinc alloy powder corrosion found in alkaline cells.

REFERENCES

U.S. Pat. No. 4,195,120.
U.S. Pat. No. 4,195,120.
U.S. Pat. No. 4,432,937.
U.S. Pat. No. 4,606,869.
U.S. Pat. No. 5,108,494.
U.S. Pat. No. 5,168,018.
U.S. Pat. No. 5,240,793.
U.S. Pat. No. 5,308,374.
U.S. Pat. No. 5,312,476.
U.S. Pat. No. 5,348,816.
U.S. Pat. No. 5,425,798.
U.S. Pat. No. 5,460,701.
U.S. Pat. No. 5,541,021.
U.S. Pat. No. 5,721,068.
U.S. Pat. No. 5,874,684.
U.S. Pat. No. 6,258,484.
U.S. Pat. No. 6,428,932.
U.S. Pat. No. 6,461,768.
U.S. Pat. No. 6,706,220.
U.S. Pat. No. 7,169,504.
U.S. Pat. No. 7,374,840.
U.S. Pat. No. 8,003,247.
International App. Pub. No. WO 1994/0019502.
International App. Pub. No. WO 2003/0106016.
International App. Pub. No. WO 2007/0264572.
International App. Pub. No. WO 2008/0153003.
European Pat. App. Pub. No. EP 0457354 A1.
Qu, Deyang "The cause of the voltage "dip" during the high rate of discharge of the primary MnO$_2$/Zn cells" *Electrochemistry Communications* 8, 1527-1530 (2006).
Qu, Deyang "Behavior of Dinonlylphenol Phosphate Ester and its influence on the oxidation of a Zn anode in alkaline solution" *Journal of Power Sources* 162, 706-712 (2006).

What is claimed is:

1. A negative electrode active material for a zinc anode alkaline electrochemical cell, comprising:
   (i) particles, comprising bismuth, and
   (ii) powder, comprising zinc,
   wherein the particles have an average particle size of at most 135 nm,
   the particles have a specific surface area of at least 5 m$^2$/g, and
   the particles are capable of plating in an alkaline electrolyte environment at least 2000 ppm bismuth on a zinc substrate.

2. The negative electrode active material of claim 1, wherein the particles comprise bismuth oxide, bismuth hydroxide, or a mixture thereof.

3. The negative electrode active material of claim 1, wherein the particles comprise tetragonal phase bismuth oxide.

4. The negative electrode active material of claim 1, wherein the powder comprises a zinc alloy.

5. The negative electrode active material of claim 1, wherein the particles have an average particle size of at most 105 nm.

6. The negative electrode active material of claim 1, wherein the particles have an average particle size of at most 50 nm.

7. The negative electrode active material of claim 1, wherein the particles have a specific surface area of at least 7 m$^2$/g.

8. The negative electrode active material of claim 1, wherein the particles have a specific surface area of at least 15m$^2$/g.

9. The negative electrode active material of claim 1, wherein the particles comprise 0.001 to 10% by weight of the negative electrode active material.

10. The negative electrode active material of claim 1, wherein:
    the powder comprises a zinc alloy,
    the particles have an average particle size of at most 105 nm,
    the particles have a specific surface area of at least 7 m$^2$/g, and
    the particles comprise 0.01 to 0.1% by weight of the negative electrode active material.

11. An anode gel for an alkaline electrochemical cell, comprising:
    (a) the negative electrode active material of claim 1,
    (b) an electrolyte, and
    (c) a gelling agent.

12. The anode gel of claim 11, further comprising a surfactant, an organic inhibitor, or both.

13. The anode gel of claim 11, wherein the gelling agent is polyacrylic acid, a salt of polyacrylic acid, or a mixture thereof.

14. The anode gel of claim 11, wherein the electrolyte is an aqueous solution of potassium hydroxide.

15. An alkaline electrochemical cell, comprising:
    (1) a positive current collector,
    (2) a cathode containing a cathode active material, in electrical contact with the positive current collector,
    (3) a negative current collector,
    (4) the anode gel of claim 11, in electrical contact with the negative current collector, and
    (5) a separator, between the cathode active material and the anode gel.

16. An anode gel for an alkaline electrochemical cell, comprising:
    (a) the negative electrode active material of claim 10,
    (b) an electrolyte, and
    (c) a gelling agent.

17. The anode gel of claim 16, further comprising a surfactant, an organic inhibitor, or both.

18. The anode gel of claim 16, wherein the gelling agent is polyacrylic acid, a salt of polyacrylic acid, or a mixture thereof.

19. The anode gel of claim 16, wherein the electrolyte is an aqueous solution of potassium hydroxide.

20. An alkaline electrochemical cell, comprising:
    (1) a positive current collector,
    (2) a cathode containing a cathode active material, in electrical contact with the positive current collector,
    (3) a negative current collector,
    (4) the anode gel of claim 16, in electrical contact with the negative current collector, and
    (5) a separator, between the cathode active material and the anode gel.

* * * * *